(12) United States Patent
Tarao et al.

(10) Patent No.: US 10,751,576 B2
(45) Date of Patent: Aug. 25, 2020

(54) GOLF BALL

(71) Applicant: Sumitomo Rubber Industries, Ltd., Kobe-shi, Hyogo (JP)

(72) Inventors: Toshiyuki Tarao, Kobe (JP); Mami Tanaka, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 16/653,105

(22) Filed: Oct. 15, 2019

(65) Prior Publication Data

US 2020/0114216 A1 Apr. 16, 2020

(30) Foreign Application Priority Data

Oct. 16, 2018 (JP) .................................. 2018-195345

(51) Int. Cl.
| | | |
|---|---|---|
| A63B 37/06 | (2006.01) | |
| A63B 37/00 | (2006.01) | |
| C08L 9/00 | (2006.01) | |
| B29C 43/00 | (2006.01) | |
| B29C 45/14 | (2006.01) | |
| B29L 31/54 | (2006.01) | |
| B29K 9/00 | (2006.01) | |

(52) U.S. Cl.
CPC ...... *A63B 37/0051* (2013.01); *A63B 37/0063* (2013.01); *B29C 43/003* (2013.01); *B29C 45/14819* (2013.01); *C08L 9/00* (2013.01); *A63B 37/0065* (2013.01); *A63B 37/0073* (2013.01); *A63B 37/0074* (2013.01); *A63B 37/0075* (2013.01); *A63B 37/0076* (2013.01); *A63B 37/0096* (2013.01); *B29K 2009/00* (2013.01); *B29L 2031/546* (2013.01)

(58) Field of Classification Search
CPC ............ A63B 37/0051; A63B 37/0039; A63B 37/0024
USPC ........................................................ 473/351
See application file for complete search history.

(56) References Cited

U.S. PATENT DOCUMENTS

| | | | |
|---|---|---|---|
| 6,139,447 A | 10/2000 | Ohama | |
| 7,622,527 B2 * | 11/2009 | Ito ............................ | B01J 20/26 525/54.4 |

(Continued)

FOREIGN PATENT DOCUMENTS

| | | |
|---|---|---|
| JP | 6-7481 A | 1/1994 |
| JP | 11-128400 A | 5/1999 |

(Continued)

*Primary Examiner* — Raeann Gorden
(74) *Attorney, Agent, or Firm* — Birch, Stewart, Kolasch & Birch, LLP

(57) ABSTRACT

An object of the present invention is to provide a golf ball having excellent shot feeling and durability. The present invention provides a golf ball comprising a constituent member containing a crosslinked rubber component and resin fine particles, wherein the resin fine particles contain a polyrotaxane component having a cyclodextrin, a linear molecule piercing through the cyclic structure of the cyclodextrin, and blocking groups located at both terminals of the linear molecule to prevent disassociation of the cyclodextrin, wherein at least a part of hydroxyl groups of the cyclodextrin is modified with a caprolactone chain via a —O—$C_3H_6$—O— group.

15 Claims, 2 Drawing Sheets

(56) References Cited

U.S. PATENT DOCUMENTS

| | | | |
|---|---|---|---|
| 10,183,197 B2 * | 1/2019 | Tarao | ................ C08L 9/00 |
| 2005/0202902 A1 | 9/2005 | Ohama et al. | |
| 2008/0249251 A1 | 10/2008 | Wachi | |
| 2009/0143170 A1 | 6/2009 | Ohira et al. | |
| 2013/0172107 A1 | 7/2013 | Higuchi et al. | |
| 2013/0172108 A1 | 7/2013 | Higuchi et al. | |
| 2016/0136484 A1 * | 5/2016 | Inoue | ............ C08G 18/4887 |
| | | | 473/377 |
| 2018/0093138 A1 | 4/2018 | Tarao et al. | |

FOREIGN PATENT DOCUMENTS

| | | |
|---|---|---|
| JP | 2001-583 A | 1/2001 |
| JP | 2003-79765 A | 3/2003 |
| JP | 2005-218618 A | 8/2005 |
| JP | 2008-29862 A | 2/2008 |
| JP | 2008-253757 A | 10/2008 |
| JP | 2009-131631 A | 6/2009 |
| JP | 2009-178520 A | 8/2009 |
| JP | 2013-138839 A | 7/2013 |
| JP | 2013-138840 A | 7/2013 |
| JP | 2018-51192 A | 4/2018 |

* cited by examiner

GOLF BALL

FIELD OF THE INVENTION

The present invention relates to a golf ball, more specifically relates to an improvement technology for a core of a golf ball.

DESCRIPTION OF THE RELATED ART

A golf ball having a soft core formed from a cured product of a rubber composition has poor durability although the golf ball has good shot feeling. A golf ball having a hard core formed from a cured product of a rubber composition has poor shot feeling although the golf ball has good durability. A golf ball striking a good balance between the durability and the shot feeling is desired.

Examples of the technology for improving the shot feeling of the golf ball include JP 2009-178520 A and JP 2008-29862 A. Examples of the technology for improving the shot feeling and durability of the golf ball include JP 2005-218618 A and JP 2009-131631 A.

JP 2009-178520 A discloses a golf ball comprising a solid core having at least one layer, and a cover having at least one layer and covering the solid core, wherein the solid core has a layer containing a polybutadiene rubber and a thermal expansive microcapsule in an amount of from 0.1 to 10 parts by weight with respect to 100 parts by weight of the polybutadiene rubber, wherein the expanded thermal expansive microcapsule exists in a dispersed state in the layer, and the contracted thermal expansive microcapsule by overheating is included in the layer.

JP 2008-29862 A discloses a solid golf ball comprising a core and a cover formed on the core, wherein the core is formed from a rubber composition containing 100 parts by weight of (i) a base rubber, 20 to 45 parts by weight of (ii) a co-crosslinking agent, 0.3 to 5 parts by weight of (iii) an organic peroxide, 0.05 to 3 parts by weight of (iv) an organic sulfur compound selected from the group consisting of a diphenyl polysulfide having 2 to 4 sulfur atoms, bis(4-methacryloyl thiophenyl)sulfide, 4,4'-dibromodiphenyl sulfide and 4,4'-thiodibenzene thiol, and 1 to 20 parts by weight of (v) tungsten.

JP 2005-218618 A discloses a solid golf ball comprising at least one core and at least one cover formed on the core, wherein the core is formed from a rubber composition containing a base rubber, a co-crosslinking agent, an organic peroxide and an organic sulfur compound, wherein the base rubber contains a polybutadiene synthesized using a rare-earth element catalyst, and the organic sulfur compound contains a polysulfide compound having a bromo group.

JP 2009-131631 A discloses a method of producing a golf ball comprising a solid core formed from a rubber composition and one or more cover covering the solid core, wherein the method comprises a step of treating a surface of the core with a solution containing a halogenated isocyanuric acid and/or a metal salt thereof, followed by covering a cover material thereon.

For example, JP H06-7481 A discloses a golf ball which is a golf ball having a single layered structure or a golf ball having a dual or more layered structure composed of a cover and one or more core, wherein a vulcanized rubber powder is contained in the golf ball having the single layered structure or in the core of the golf ball having the dual or more layered structure. JP H11-128400 A discloses a golf ball which is a golf ball having a single layered structure or a golf ball having a dual or more layered structure composed of one or more core and one or more cover, wherein the golf ball having the single layered structure or the core of the golf ball having the dual or more layered structure is formed from a vulcanized molded product of a rubber composition containing a vulcanized rubber powder in an amount of from 5 to 60 parts by weight with respect to 100 parts by weight of a base rubber consisting of a mixture containing (A) a polybutadiene having a Mooney viscosity of from 40 to 65 and (B) a polybutadiene having a Mooney viscosity of from 20 to 35 in a mixing weight ratio, the polybutadiene (A)/the polybutadiene (B), of from 40/60 to 90/10. It is noted that these documents disclose that the hardness of a core in which the vulcanized rubber powder is not contained is preferably nearly same as the hardness of the vulcanized rubber powder.

Examples of the technology characterized in a material of a vulcanized rubber powder include JP 2003-79765 A and JP 2008-253757 A. JP 2003-79765 A discloses a golf ball having a dual or more layered structure composed of a core and a cover, wherein the core contains 1 to 15 parts by mass of a vulcanized rubber powder crosslinked by an unsaturated carboxylic acid magnesium salt with respect to 100 parts by mass of a base rubber, and a compression deformation amount when applying a load from 98 N to 1274 N to the core is in a range of from 2.0 to 7.0 mm. JP 2008-253757 A discloses a golf ball comprising, as a constituent element, a heat molded product obtained by vulcanizing a rubber composition in which a base rubber and an unsaturated carboxylic acid or a salt thereof are contained as an essential component, wherein a vulcanized rubber powder from which a soluble component has been removed by liquid washing is added in the rubber composition.

JP 2013-138839 A and JP 2013-138840 A disclose a golf ball comprising a core and a cover, wherein the core is formed from a rubber composition containing a rubber powder or polyurethane powder, and a resin material of the cover has specific properties.

JP 2001-583 A discloses a solid golf ball comprising a solid core and a cover covering the solid core, wherein particles formed from a different material from a solid core forming material are mixed in the solid core, and the particles have a Shore D hardness of 10 or more greater than a surface hardness of the solid core.

JP 2018-51192 A discloses a golf ball comprising a constituent member containing a crosslinked rubber component and a polyrotaxane component, wherein the polyrotaxane has a cyclodextrin, a linear molecule piercing through the cyclic structure of the cyclodextrin, and blocking groups located at both terminals of the linear molecule to prevent disassociation of the cyclodextrin, wherein at least a part of hydroxyl groups of the cyclodextrin is modified with a caprolactone chain via a —O—$C_3H_6$—O— group.

SUMMARY OF THE INVENTION

Further improvement in the shot feeling and the durability is desired. An object of the present invention is to provide a golf ball having improved shot feeling and durability.

The present invention provides a golf ball comprising a constituent member containing a crosslinked rubber component and resin fine particles, wherein the resin fine particles contain a polyrotaxane component having a cyclodextrin, a linear molecule piercing through the cyclic structure of the cyclodextrin, and blocking groups located at both terminals of the linear molecule to prevent disassociation of the cyclodextrin, wherein at least a part of hydroxyl groups of the cyclodextrin is modified with a caprolactone chain via a —O—C$_3$H$_6$—O— group. If the fine particles are dispersed in the crosslinked rubber component, the obtained golf ball has improved shot feeling and durability.

According to the present invention, a golf ball having improved shot feeling and durability is provided.

DESCRIPTION OF THE PREFERRED EMBODIMENT

Figure 1:
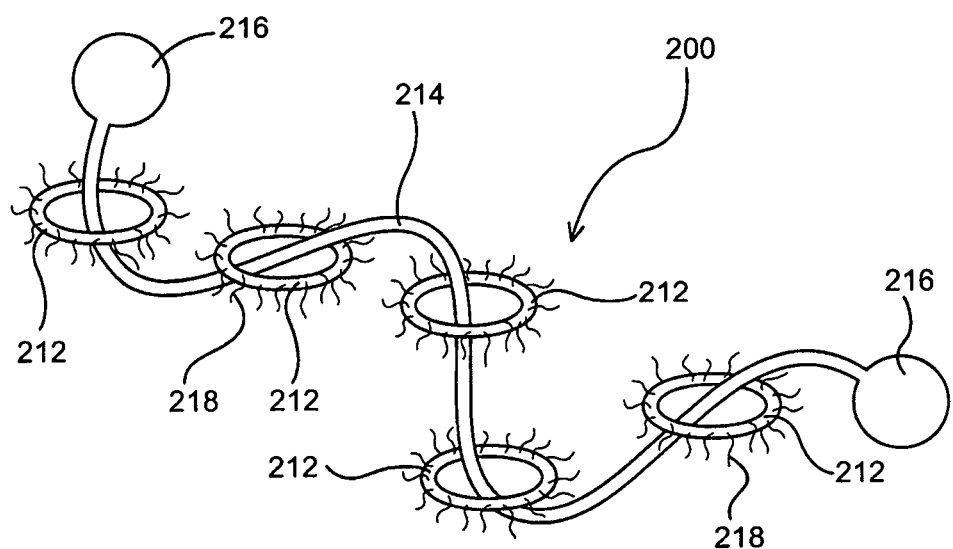
FIG. 1 is an illustrative figure illustrating a molecular structure of one example of polyrotaxane fine particles used in the present invention.

The present invention provides a golf ball comprising a constituent member containing a crosslinked rubber component and (d) resin fine particles, wherein (d) the resin fine particles contain a polyrotaxane component having a cyclodextrin, a linear molecule piercing through the cyclic structure of the cyclodextrin, and blocking groups located at both terminals of the linear molecule to prevent disassociation of the cyclodextrin, wherein at least a part of hydroxyl groups of the cyclodextrin is modified with a caprolactone chain via a —O—C$_3$H$_6$—O— group (hereinafter sometimes referred to as "(d) polyrotaxane fine particles").

The crosslinked rubber component contained in the constituent member according to the present invention is a cured product of a rubber composition containing (a) a base rubber. The constituent member of the golf ball according to the present invention is preferably formed from a rubber composition containing (a) the base rubber, (b) an α,β-unsaturated carboxylic acid having 3 to 8 carbon atoms and/or a metal salt thereof as a co-crosslinking agent, (c) a crosslinking initiator, and (d) the polyrotaxane fine particles. The constituent member obtained by curing the rubber composition has the crosslinked rubber component and (d) the polyrotaxane fine particles.

[(a) Base Rubber]

As (a) the base rubber, a natural rubber and/or a synthetic rubber may be used. For example, polybutadiene rubber, natural rubber, polyisoprene rubber, styrene polybutadiene rubber, ethylene-propylene-diene rubber (EPDM), or the like may be used. These rubbers may be used solely or in combination of at least two of them. Among them, typically preferred is a high-cis polybutadiene having a cis-1,4 bond in an amount of 40 mass % or more, preferably 80 mass % or more, more preferably 90 mass % or more, and even more preferably 95 mass % or more in view of its superior resilience property.

The high-cis polybutadiene preferably has a 1,2-vinyl bond in an amount of 2.0 mass % or less, more preferably 1.7 mass % or less, and even more preferably 1.5 mass % or less. If the amount of the 1,2-vinyl bond is excessively high, the resilience may be lowered.

The high-cis polybutadiene is preferably one synthesized using a rare-earth element catalyst. When a neodymium catalyst employing a neodymium compound which is a lanthanum series rare-earth element compound, is used, a polybutadiene rubber having a high amount of the cis-1,4 bond and a low amount of the 1,2-vinyl bond is obtained with an excellent polymerization activity, and thus such polybutadiene rubber is particularly preferred.

The high-cis polybutadiene preferably has a Mooney viscosity (ML$_{1+4}$ (100° C.)) of 30 or more, more preferably 32 or more, and even more preferably 35 or more, and preferably has a Mooney viscosity (ML$_{1+4}$ (100° C.)) of 140 or less, more preferably 120 or less, even more preferably 100 or less, and most preferably 55 or less. It is noted that the Mooney viscosity (ML$_{1+4}$ (100° C.)) in the present invention is a value measured according to JIS K6300 using an L rotor under the conditions of preheating time: 1 minute, rotor rotation time: 4 minutes, and temperature: 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.0 or less. If the molecular weight distribution (Mw/Mn) of the high-cis polybutadiene is excessively low, the processability may deteriorate, and if the molecular weight distribution (Mw/Mn) of the high-cis polybutadiene is excessively high, the resilience may be lowered. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

[(b) Co-Crosslinking Agent]

(b) The α,β-unsaturated carboxylic acid having 3 to 8 carbon atoms and/or the metal salt thereof is blended as a co-crosslinking agent in the rubber composition, and has an action of crosslinking a rubber molecule by graft polymerization to a base rubber molecular chain. In the case that the rubber composition used in the present invention contains only the α,β-unsaturated carboxylic acid having 3 to 8 carbon atoms as the co-crosslinking agent, the rubber composition preferably further contains (f) a metal compound. This is because neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms as the co-crosslinking agent. It is noted that in case of using the α,β-unsaturated carboxylic acid having 3 to 8 carbon atoms and the metal salt thereof in combination as the co-crosslinking agent, (f) the metal compound may be used as an optional component.

Examples of the α,β-unsaturated carboxylic acid having 3 to 8 carbon atoms include acrylic acid, methacrylic acid, fumaric acid, maleic acid, and crotonic acid.

Examples of the metal constituting the metal salt of the α,β-unsaturated carboxylic acid having 3 to 8 carbon atoms include a monovalent metal ion such as sodium, potassium, and lithium; a divalent metal ion such as magnesium, calcium, zinc, barium, and cadmium; a trivalent metal ion such as aluminum; and other metal ions such as tin, and zirconium. The metal component may be used solely or as a mixture of at least two of them. Among them, as the metal component, the divalent metal such as magnesium, calcium, zinc, barium, and cadmium is preferred. This is because use of the divalent metal salt of the α,β-unsaturated carboxylic acid having 3 to 8 carbon atoms easily generates a metal crosslinking between the rubber molecules. Especially, as the divalent metal salt, zinc acrylate is preferred, because zinc acrylate enhances the resilience of the resultant golf ball. The α,β-unsaturated carboxylic acid having 3 to 8 carbon atoms and/or the metal salt thereof may be used solely or in combination of at least two of them.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of (b) the α,β-unsaturated carboxylic acid having 3 to 8 carbon atoms and/or the metal salt thereof is less than 15 parts by mass, the amount of (c) the crosslinking initiator which will be explained below must be increased in order to obtain an appropriate hardness of the constituent member formed from the rubber composition, which tends to lower the resilience of the golf ball. On the other hand, if the amount of the α,β-unsaturated carboxylic acid having 3 to 8 carbon atoms and/or the metal salt thereof is more than 50 parts by mass, the constituent member formed from the rubber composition becomes so hard that the shot feeling of the golf ball may be lowered.

[(c) Crosslinking Initiator]

(c) The crosslinking initiator is blended in order to crosslink (a) the base rubber component. As (c) the crosslinking initiator, an organic peroxide is preferred. Specific examples of the organic peroxide include an organic peroxide such as dicumyl peroxide, 1,1-bis(t-butylperoxy)-3,3,5-trimethylcyclohexane, 2,5-dimethyl-2,5-di(t-butylperoxy)hexane, and di-t-butylperoxide. These organic peroxides may be used solely or in combination of at least two of them. Among them, dicumyl peroxide is preferably used.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of (c) the crosslinking initiator is less than 0.2 part by mass, the constituent member formed from the rubber composition becomes so soft that the resilience of the golf ball may be lowered. If the amount of (c) the crosslinking initiator is more than 5.0 parts by mass, the amount of (b) the co-crosslinking agent which has been explained above must be decreased in order to obtain an appropriate hardness of the constituent member formed from the rubber composition, which may lower the resilience of the golf ball or worsen the durability of the golf ball.

[(d) Resin Fine Particles Containing Polyrotaxane Component]

Next, (d) the polyrotaxane fine particles will be explained. (d) The polyrotaxane fine particles contain a polyrotaxane component. The polyrotaxane component has a cyclodextrin, a linear molecule penetrating the cyclic structure of the cyclodextrin in a skewering manner, and blocking groups located at both terminals of the linear molecule to prevent disassociation of the cyclic molecule. The polyrotaxane is viscoelastic, since the cyclodextrin molecule is movable along the linear molecule that penetrates the cyclodextrin in a skewering manner (pulley effect). Even if a tension is applied to the polyrotaxane, the tension can be uniformly dispersed due to the pulley effect.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and α-cyclodextrin is preferable. As the cyclodextrin, one type may be used solely, and two or more types may be used in combination.

The linear molecule is preferably a linear molecule piercing through the cyclic structure of the cyclodextrin so that the cyclic structure of the cyclodextrin is rotatable around the linear molecule. Examples of the linear molecule include polyalkylene, polyester, polyether, and polyacrylic acid. Among them, polyether is preferable, polyethylene glycol is particularly preferable. Polyethylene glycol has less steric hindrance, and thus can easily penetrate the cyclic structure of the cyclodextrin in a skewering manner.

The weight average molecular weight of the linear molecule is preferably 5,000 or more, more preferably 6,000 or more, and is preferably 100,000 or less, more preferably 80,000 or less.

The linear molecule preferably has functional groups at both terminals thereof. When the linear molecule has the functional group, the linear molecule easily reacts with the blocking group. Examples of the functional group include a hydroxyl group, carboxyl group, amino group, and thiol group.

The blocking group is not particularly limited, as long as it is located at both terminals of the linear molecule to prevent disassociation of the cyclodextrin from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number of the cyclodextrins penetrated by the linear molecule preferably ranges from 0.06 to 0.61, more preferably ranges from 0.11 to 0.48, and even more preferably ranges from 0.24 to 0.41, if the maximum number thereof is deemed as 1. This is because if the number is less than 0.06, the pulley effect may not be exerted, and if the number exceeds 0.61, the cyclodextrins are very densely located, so that the movability of the cyclodextrin may decrease.

As the polyrotaxane, a polyrotaxane having at least a part of hydroxyl groups of the cyclodextrin being modified with a caprolactone chain, is preferred. Modifying with the caprolactone enhances the flexibility of the polyrotaxane.

As the above modification, for example, the hydroxyl groups of the cyclodextrin are treated with propylene oxide to hydroxylpropylate the cyclodextrin, and then ε-caprolactone is added to perform ring-opening polymerization. As a result of this modification, the caprolactone chain —(CO(CH$_2$)$_5$O)nH (n is a natural number of 1 to 100) is linked to the exterior side of the cyclic structure of the cyclodextrin via —O—C$_3$H$_6$—O— group. "n" represents the degree of polymerization, and is preferably a natural number of 1 to 100, more preferably a natural number of 2 to 70, and even more preferably a natural number of 3 to 40. At another terminal of the caprolactone chain, a hydroxyl group is formed through the ring-opening polymerization.

The ratio of the hydroxyl groups modified with the caprolactone chain to all the hydroxyl groups (100 mole %) included in the cyclodextrin before the modification is preferably 2 mole % or more, more preferably 5 mole % or more, and even more preferably 10 mole % or more, and is preferably 100 mole % or less, more preferably 90 mole % or less, and even more preferably 80 mole % or less. If the ratio of the hydroxyl groups modified with the caprolactone chain falls within the above range, the flexibility of the polyrotaxane is greater.

FIG. 1 is an illustrative figure showing a molecular structure of one example of a polyrotaxane used in the present invention. The polyrotaxane 200 has a cyclodextrin 212, a linear molecule 214 piercing through the cyclic structure of the cyclodextrin 212, and blocking groups 216 located at both terminals of the linear molecule 214 to prevent disassociation of the cyclic molecule, wherein a caprolactone chain 218 bonds to an exterior side of the cyclic structure of the cyclodextrin via a —O—$C_3H_6$—O— group (not shown).

The hydroxyl value of the polyrotaxane is preferably 10 mg KOH/g or more, more preferably 15 mg KOH/g or more, and even more preferably 20 mg KOH/g or more, and is preferably 400 mg KOH/g or less, more preferably 300 mg KOH/g or less, even more preferably 220 mg KOH/g or less, and particularly preferably 180 mg KOH/g or less. This is because if the hydroxyl value of the polyrotaxane falls within the above range, the reactivity with the polyisocyanate is enhanced. It is noted that the hydroxyl value can be measured according to JIS K 1557-1, for example, by an acetylation method.

The total molecular weight of the polyrotaxane is preferably 30,000 or more, more preferably 40,000 or more, and even more preferably 50,000 or more, and is preferably 3,000,000 or less, more preferably 2,500,000 or less, and even more preferably 2,000,000 or less, in a weight average molecular weight. This is because if the weight average molecular weight is less than 30,000, the durability improvement effect is small, and if the weight average molecular weight is more than 3,000,000, the reactivity with the polyisocyanate is lowered. It is noted that the weight average molecular weight can be measured, for example, by gel permeation chromatography (GPC) using polystyrene as a standard substance, tetrahydrofuran as an eluant, and an organic solvent system GPC column (e.g., "Shodex (registered trademark) KF series" available from Showa Denko K.K.) as a column.

(d) The polyrotaxane fine particles are preferably crosslinked resin fine particles, and more preferably one obtained by curing the polyrotaxane component with a polyisocyanate component. This is because if the polyrotaxane component is cured with the polyisocyanate component, the fine particles having the crosslinked structure are easily obtained.

Examples of the polyisocyanate component constituting the crosslinked resin fine particles include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI); and derivatives of these polyisocyanates.

The rubber composition for forming the constituent member of the golf ball according to the present invention preferably contains (d) the polyrotaxane fine particles in an amount of 1 part by mass or more, more preferably in an amount of 2 parts by mass or more, and even more preferably in an amount of 3 parts by mass or more, and preferably in an amount of 15 parts by mass or less, more preferably in an amount of 13 parts by mass or less, and even more preferably in an amount of 10 parts by mass or less, with respect to 100 parts by mass of (a) the base rubber component. This is because if the amount of (d) the polyrotaxane fine particles falls within the above range, the durability is enhanced.

The median particle size (particle size at 50% in the volume accumulation distribution) of (d) the polyrotaxane fine particles used in the present invention is preferably 1 µm or more, more preferably 3 µm or more, and even more preferably 5 µm or more, and is preferably 50 µm or less, more preferably 45 µm or less, and even more preferably 40 µm or less. This is because if the median particle size of (d) the polyrotaxane fine particles falls within the above range, the dispersibility of (d) the polyrotaxane fine particles is better.

(d) The polyrotaxane fine particles are preferably spherical.

[(f) Metal Compound]

In the case that the rubber composition used in the present invention contains only the α,β-unsaturated carboxylic acid having 3 to 8 carbon atoms as the co-crosslinking agent, the rubber composition preferably further contains (f) a metal compound. (f) The metal compound is not particularly limited as long as it can neutralize (b) the α,β-unsaturated carboxylic acid having 3 to 8 carbon atoms in the rubber composition. Examples of (f) the metal compound include a metal hydroxide such as magnesium hydroxide, zinc hydroxide, calcium hydroxide, sodium hydroxide, lithium hydroxide, potassium hydroxide and copper hydroxide; a metal oxide such as magnesium oxide, calcium oxide, zinc oxide and copper oxide; and a metal carbonate such as magnesium carbonate, zinc carbonate, calcium carbonate, sodium carbonate, lithium carbonate and potassium carbonate. (f) The metal compound is preferably a divalent metal compound, more preferably a zinc compound. This is because the divalent metal compound reacts with the α,β-unsaturated carboxylic acid having 3 to 8 carbon atoms, thereby forming a metal crosslinking. Further, use of the zinc compound provides a golf ball with higher resilience. (f) The metal compound may be used solely or as a mixture of at least two of them.

[(g) Organic Sulfur Compound]

The rubber composition used in the present invention preferably further contains (g) an organic sulfur compound. If the rubber composition contains (g) the organic sulfur compound, the spherical core has enhanced resilience.

(g) The organic sulfur compound is not particularly limited, as long as it is an organic compound having a sulfur atom in the molecule thereof. Examples of (g) the organic sulfur compound include an organic compound having a thiol group (—SH) or a polysulfide bond having 2 to 4 sulfur atoms (—S—S—, —S—S—S—, or —S—S—S—S—), and a metal salt thereof (—SM, —S-M-S—, or the like; M is a metal atom). Examples of the metal salt include a monovalent metal salt such as sodium, lithium, potassium, copper (I) and silver (I); and a divalent metal salt such as zinc, magnesium, calcium, strontium, barium, titanium (II), manganese (II), iron (II), cobalt (II), nickel (II), zirconium (II) and tin (II). Furthermore, (g) the organic sulfur compound may be any one of an aliphatic compound (aliphatic thiol, aliphatic thiocarboxylic acid, aliphatic dithiocarboxylic acid, aliphatic polysulfide, or the like), a heterocyclic compound, an alicyclic compound (alicyclic thiol, alicyclic thiocarboxylic acid, alicyclic dithiocarboxylic acid, alicyclic polysulfide, or the like), and an aromatic compound.

Examples of (g) the organic sulfur compound include compounds of thiols (thiophenols and thionaphthols), polysulfides, thiurams, thiocarboxylic acids, dithiocarboxylic acids, sulfenamides, dithiocarbamates and thiazoles.

Examples of the thiols include thiophenols and thionaphthols. Examples of the thiophenols include thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, and 2,4,5,6-tetrafluorothiophenol, pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol, and pentabromothiophenol; thiophenols substituted with an iodo group, such as 4-iodothiophenol, 2,4-diiodothiophenol, 2,5-diiodothiophenol, 2,6-diiodothiophenol, 2,4,5-triiodothiophenol, and 2,4,5,6-tetraiodothiophenol, pentaiodothiophenol; and metal salts thereof. As the metal salt, a zinc salt is preferred.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and a metal salt thereof. Preferable examples include 2-thionaphthol, 1-thionaphthol, and a metal salt thereof. The metal salt is preferably a divalent metal salt, more preferably a zinc salt. Specific examples of the metal salt include the zinc salt of 1-thionaphthol and the zinc salt of 2-thionaphthol.

The polysulfides are organic sulfur compounds having a polysulfide bond, and examples thereof include disulfides, trisulfides, and tetrasulfides. As the polysulfides, diphenyl polysulfides are preferable.

Examples of the diphenyl polysulfides include diphenyl disulfide; diphenyl disulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl) disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl) disulfide, bis(2,4,5,6-tetrachlorophenyl)disulfide, bis(pentachlorophenyl)disulfide, bis(4-bromophenyl)disulfide, bis (2,5-dibromophenyl)disulfide, bis(2,6-dibromophenyl) disulfide, bis(2,4,5-tribromophenyl)disulfide, bis(2,4,5,6-tetrabromophenyl)disulfide, bis(pentabromophenyl) disulfide, bis(4-iodophenyl)disulfide, bis(2,5-diiodophenyl) disulfide, bis(2,6-diiodophenyl)disulfide, bis(2,4,5-triiodophenyl)disulfide, bis(2,4,5,6-tetraiodophenyl) disulfide, and bis(pentaiodophenyl)disulfide; and diphenyl disulfides substituted with an alkyl group, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide.

Examples of the thiurams include thiuram monosulfides such as tetramethylthiuram monosulfide; thiuram disulfides such as tetramethylthiuram disulfide, tetraethylthiuram disulfide, and tetrabutylthiuram disulfide; and thiuram tetrasulfides such as dipentamethylenethiuram tetrasulfide.

Examples of the thiocarboxylic acids include a naphthalene thiocarboxylic acid. Examples of the dithiocarboxylic acids include a naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

(g) The organic sulfur compound is preferably thiophenols and/or the metal salt thereof, thionaphthols and/or the metal salt thereof, diphenyl disulfides, and thiuramdisulfides, more preferably 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl)disulfide, bis(2,6-dichlorophenyl)disulfide, bis(2,6-dibromophenyl)disulfide, bis(2,6-diiodophenyl)disulfide, and bis(pentabromophenyl) disulfide.

(g) The organic sulfur compound may be used solely or in combination of at least two of them.

The amount of (g) the organic sulfur compound is preferably 0.05 part by mass or more, more preferably 0.1 part by mass or more, and even more preferably 0.2 part by mass or more, and is preferably 5.0 parts by mass or less, more preferably 3.0 parts by mass or less, and even more preferably 2.0 parts by mass or less, with respect to 100 parts by mass of (a) the base rubber. If the amount of (g) the organic sulfur compound is less than 0.05 part by mass, the effect of adding (g) the organic sulfur compound may not be obtained, and thus the resilience of the golf ball may not be improved. In addition, if the amount of (g) the organic sulfur compound is more than 5.0 parts by mass, the obtained golf ball may have an excessively large compression deformation amount, and thus the resilience thereof may be lowered.

The rubber composition used in the present invention may further contain an additive such as a pigment, a filler for adjusting a weight or the like, an antioxidant, a peptizing agent and a softening agent where necessary. Examples of the pigment blended into the rubber composition include a white pigment, a blue pigment and a purple pigment.

As the white pigment, titanium oxide is preferably used. The type of titanium oxide is not particularly limited, but rutile type is preferably used because of its high opacity. In addition, the amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The amount of the blue pigment is preferably 0.001 part by mass or more, more preferably 0.05 part by mass or more, and is preferably 0.2 part by mass or less, more preferably 0.1 part by mass or less, with respect to 100 parts by mass of (a) the base rubber. If the amount of the blue pigment is less than 0.001 part by mass, blueness is insufficient, and the color looks yellowish. If the amount of the blue pigment exceeds 0.2 part by mass, blueness is excessively strong, and a vivid white appearance is not provided.

The filler blended in the rubber composition is used as a weight adjusting agent for mainly adjusting the weight of the golf ball obtained as a final product. The filler may be blended where necessary. Examples of the filler include an inorganic filler such as zinc oxide, barium sulfate, calcium carbonate, magnesium oxide, tungsten powder, and molybdenum powder. Zinc oxide is particularly preferably used as the filler. It is considered that zinc oxide functions as a vulcanization activator and increases the hardness of the entire spherical core. The amount of the filler is preferably 0.5 part by mass or more, more preferably 1 part by mass or more, and is preferably 30 parts by mass or less, more preferably 25 parts by mass or less, and even more preferably 20 parts by mass or less, with respect to 100 parts by mass of the base rubber. This is because if the amount of the filler is less than 0.5 part by mass, it is difficult to adjust the weight, while if the amount of the filler exceeds 30 parts by mass, the weight ratio of the rubber component is reduced and thus the resilience tends to be lowered.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

The constituent member of the golf ball according to the present invention is obtained by molding the kneaded rubber composition in a mold. The molding temperature is preferably 120° C. or more, more preferably 150° C. or more, and even more preferably 160° C. or more, and is preferably 170° C. or less. If the molding temperature is more than 170° C., the hardness of the constituent member tends to be lowered. In addition, the molding pressure preferably ranges from 2.9 MPa to 11.8 MPa, and the molding time preferably ranges from 10 min to 60 min.

[Golf Ball]

The golf ball according to the present invention is not particularly limited, as long as it comprises a constituent member containing the crosslinked rubber component and (d) the polyrotaxane fine particles. Examples of the golf ball according to the present invention include a one-piece golf ball, a two-piece golf ball, a three-piece golf ball, and a multi-piece golf ball. In a preferable embodiment, the golf ball according to the present invention comprises a spherical core and at least one cover covering the spherical core, wherein the spherical core is the constituent member formed from the above described rubber composition. The spherical core may be either a single layered core or a dual layered core composed of an inner core layer and an outer core layer. In the case of the dual layered core, it is preferable that either of the inner core layer and outer core layer is the constituent member formed from the above described rubber composition, and it is more preferable that the inner core layer is the constituent member formed from the above described rubber composition.

[Spherical Core]

The diameter of the spherical core is preferably 34.8 mm or more, more preferably 36.8 mm or more, and even more preferably 38.8 mm or more, and is preferably 42.2 mm or less, more preferably 41.8 mm or less, even more preferably 41.2 mm or less, and most preferably 40.8 mm or less. If the diameter of the spherical core is 34.8 mm or more, the cover is not excessively thick and thus the resilience is better. On the other hand, if the diameter of the spherical core is 42.2 mm or less, the cover is not excessively thin and thus the cover functions better.

When the spherical core has a diameter in a range of from 34.8 mm to 42.2 mm, the compression deformation amount of the spherical core (shrinking amount of the spherical core along the compression direction) when applying a load from 98 N as an initial load to 1275 N as a final load to the spherical core is preferably 2.6 mm or more, more preferably 2.8 mm or more, and even more preferably 3.0 mm or more, and is preferably 5.4 mm or less, more preferably 5.2 mm or less, and even more preferably 5.0 mm or less. If the compression deformation amount is 2.6 mm or more, the shot feeling is better, and if the compression deformation amount is 5.4 mm or less, the resilience is better.

The center hardness Ho of the spherical core is preferably 45 or more, more preferably 48 or more, and even more preferably 50 or more in Shore C hardness. If the center hardness Ho of the spherical core is less than 45 in Shore C hardness, the spherical core is so soft that the resilience thereof may deteriorate. In addition, the center hardness Ho of the spherical core is preferably 70 or less, more preferably 68 or less, and even more preferably 65 or less in Shore C hardness. If the center hardness Ho is more than 70 in Shore C hardness, the spherical core is so hard that the shot feeling thereof may deteriorate.

The surface hardness Hs of the spherical core is preferably 70 or more, more preferably 72 or more, and even more preferably 74 or more, and is preferably 90 or less, more preferably 88 or less in Shore C hardness. If the surface hardness of the spherical core is 70 or more in Shore C hardness, the spherical core does not become excessively soft and thus better resilience is obtained. In addition, if the surface hardness of the spherical core is 90 or less in Shore C hardness, the spherical core does not become excessively hard and thus better shot feeling is obtained.

[Cover]

The cover of the golf ball of the present invention is formed from a cover composition containing a resin component. Examples of the resin component include an ionomer resin; a thermoplastic polyurethane elastomer having a trade name of "Elastollan (registered trademark)" available from BASF Japan Ltd.; a thermoplastic polyamide elastomer having a trade name of "Pebax (registered trademark)" available from Arkema K. K.; a thermoplastic polyester elastomer having a trade name of "Hytrel (registered trademark)" available from Du Pont-Toray Co., Ltd.; and a thermoplastic styrene elastomer having a trade name of "TEFABLOC (registered trademark)" available from Mitsubishi Chemical Corporation.

Examples of the ionomer resin include a product prepared by neutralizing at least a part of carboxyl groups in a binary copolymer composed of an olefin and an α,β-unsaturated carboxylic acid having 3 to 8 carbon atoms with a metal ion; a product prepared by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion; and a mixture of those. The olefin is preferably an olefin having 2 to 8 carbon atoms, and examples of the olefin include ethylene, propylene, butene, pentene, hexene, heptene, and octene. The olefin is more preferably ethylene. Examples of the α,β-unsaturated carboxylic acid having 3 to 8 carbon atoms include acrylic acid, methacrylic acid, fumaric acid, maleic acid, and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferred. Among these, the ionomer resin is preferably a metal ion-neutralized product of a binary copolymer composed of ethylene and (meth)acrylic acid, and a metal ion-neutralized product of a ternary copolymer composed of ethylene, (meth)acrylic acid and (meth)acrylic acid ester.

Specific examples of the ionomer resin include trade name "Himilan (registered trademark) (e.g. a binary copolymerized ionomer resin such as Himilan 1555 (Na), Himilan 1557 (Zn), Himilan 1605 (Na), Himilan 1706 (Zn), Himilan 1707 (Na), Himilan AM3711 (Mg); and a ternary copolymerized ionomer resin such as Himilan 1856 (Na), Himilan 1855 (Zn))" available from Du Pont-Mitsui Polychemicals Co., Ltd.

Further, examples of the ionomer resin also include "Surlyn (registered trademark) (e.g. a binary copolymerized ionomer resin such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and a ternary copolymerized ionomer resin such as Surlyn 8120 (Na), Surlyn 8320 (Na), Surlyn 9320 (Zn), Surlyn 6320 (Mg), HPF 1000 (Mg), HPF 2000 (Mg))" available from E.I. du Pont de Nemours and Company.

Further, examples of the ionomer resin also include "Iotek (registered trademark) (e.g. a binary copolymerized ionomer resin such as Iotek 8000 (Na), Iotek 8030 (Na), Iotek 7010 (Zn), Iotek 7030 (Zn); and a ternary copolymerized ionomer resin such as Iotek 7510 (Zn), Iotek 7520 (Zn))" available from ExxonMobil Chemical Corporation.

It is noted that Na, Zn, Li, Mg and the like described in the parentheses after the trade names of the above ionomer resins indicate metal types of neutralizing metal ions of the ionomer resins. The above ionomer resins may be used solely or as a mixture of two or more of them.

The cover composition constituting the cover of the golf ball according to the present invention preferably contains, as a resin component, a thermoplastic polyurethane elastomer or an ionomer resin. In case of using the ionomer resin, it is preferred to use a thermoplastic styrene elastomer in combination. The amount of the polyurethane or ionomer resin in the resin component of the cover composition is preferably 50 mass % or more, more preferably 60 mass % or more, and even more preferably 70 mass % or more.

In addition to the above resin component, the cover composition may further contain a pigment component such as a white pigment (e.g. titanium oxide), a blue pigment and a red pigment; a weight adjusting agent such as zinc oxide, calcium carbonate and barium sulfate; a dispersant; an antioxidant; an ultraviolet absorber; a light stabilizer; a fluorescent material or a fluorescent brightener; and the like, as long as they do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. This is because if the amount of the white pigment is 0.5 part by mass or more, it is possible to impart the opacity to the cover, and if the amount of the white pigment is more than 10 parts by mass, the durability of the obtained cover may deteriorate.

It is preferred that the slab hardness of the cover composition is appropriately set in accordance with the desired performance of the golf ball. For example, in case of a so-called distance golf ball which focuses on a flight distance, the cover composition preferably has a slab hardness of 50 or more, more preferably 55 or more, and even more preferably 60 or more, and preferably has a slab hardness of 80 or less, more preferably 70 or less, and even more preferably 68 or less in Shore D hardness. If the cover composition has a slab hardness of 50 or more, the obtained golf ball has a higher launch angle and lower spin rate on driver shots and iron shots, and thus travels a greater flight distance. Further, if the cover composition has a slab hardness of 80 or less, the golf ball excellent in durability is obtained. In addition, in case of a so-called spin golf ball which focuses on controllability, the cover composition preferably has a slab hardness of less than 50, and preferably has a slab hardness of 20 or more, more preferably 25 or more, and even more preferably 30 or more in Shore D hardness. If the cover composition has a slab hardness of less than 50 in Shore D hardness, the obtained golf ball travels a great distance on driver shots due to the core according to the present invention, and at the same time, the obtained golf ball readily stops on the green due to the high spin rate on approach shots. Further, if the cover composition has a slab hardness of 20 or more in Shore D hardness, the abrasion resistance becomes better. In case of a plurality of cover layers, the slab hardness of the cover composition constituting each layer may be identical to or different from each other, as long as the slab hardness of the cover composition constituting each layer falls within the above range.

Examples of the method for molding the cover of the golf ball of the present invention include a method which comprises molding the cover composition into a hollow-shell, covering the core with a plurality of the hollow-shells and subjecting the core with a plurality of the hollow shells to the compression molding (preferably a method which comprises molding the cover composition into a half hollow-shell, covering the core with two of the half hollow-shells, and subjecting the core with two of the half hollow-shells to the compression molding); and a method which comprises injection molding the cover composition directly onto the core.

When molding the cover in the compression molding method, molding of the half shell may be conducted by either a compression molding method or an injection molding method, but the compression molding method is preferred. The compression molding of the cover composition into the half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of the method for molding the cover using half shells include a method of covering the core with two of the half shells and then subjecting the core with two of the half shells to the compression molding. The compression molding of the half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In case of injection molding the cover composition into the cover, the cover composition extruded in a pellet form beforehand may be used for the injection molding, or the cover materials such as the base resin components and the pigment may be dry blended, followed by directly injection molding the blended material. It is preferred to use upper and lower molds having a hemispherical cavity and pimples for forming the cover, wherein a part of the pimples also serves as a retractable hold pin. When molding the cover by the injection molding, the hold pin is protruded to hold the core, and the cover composition is charged and then cooled to obtain the cover. For example, the molding of the cover may be conducted as follows: the cover composition heated to a temperature ranging from 200° C. to 250° C. is charged for 0.5 to 5 seconds into a mold held under a pressure of 9 MPa to 15 MPa, and after cooling for 10 to 60 seconds, the mold is opened.

When molding the cover, concave portions called "dimple" are usually formed on the surface of the cover. The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The thickness of the cover is preferably 4.0 mm or less, more preferably 3.0 mm or less, and even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and wear resistance of the cover may deteriorate. In the case that the cover has a plurality of layers, it is preferred that the total thickness of the cover layers falls within the above range.

The golf ball body having the cover formed thereon is ejected from the mold, and is preferably subjected to surface treatments such as deburring, cleaning and sandblast where necessary. In addition, if desired, a paint film or a mark may be formed. The paint film preferably has a thickness of, but is not particularly limited to, 5 μm or more, more preferably 7 μm or more, and preferably has a thickness of 50 μm or less, more preferably 40 μm or less, even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

[Golf Ball]

Figure 2:
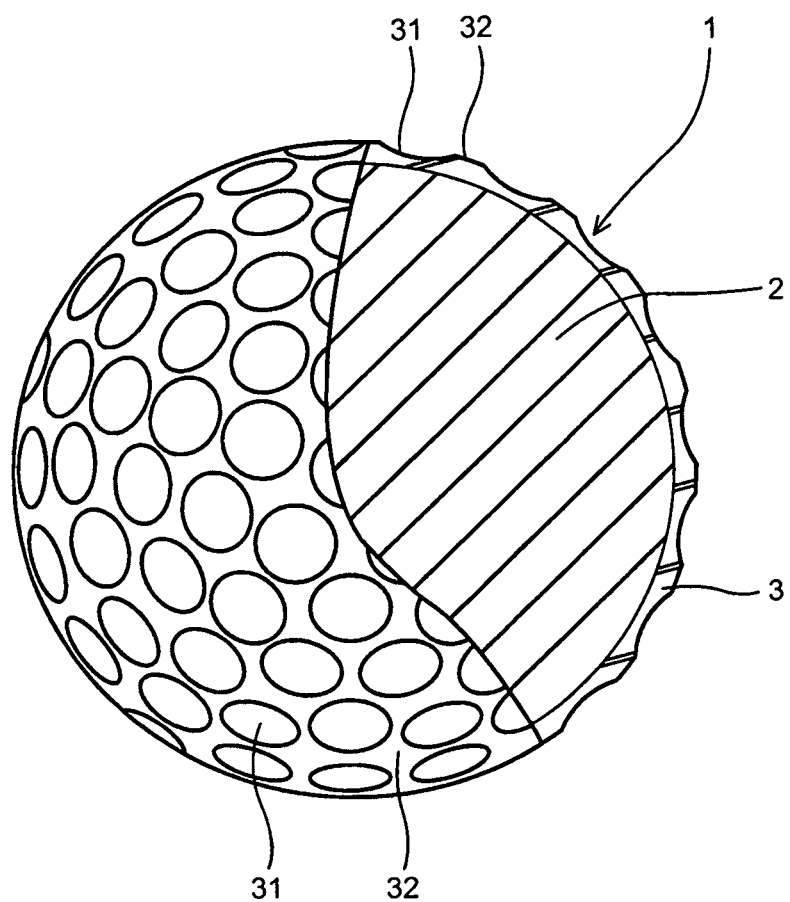
FIG. 2 is a partially cutaway cross-sectional view of a golf ball according to one embodiment of the present invention.

The construction of the golf ball according to the present invention is not particularly limited, as long as the golf ball comprises a spherical core and at least one cover covering the spherical core. FIG. 2 is a partially cutaway cross-sectional view of a golf ball 1 according to one embodiment of the present invention. The golf ball 1 comprises a spherical core 2, and a cover 3 covering the spherical core 2. A plurality of dimples 31 are formed on the surface of the cover. Other portion than the dimples 31 on the surface of the golf ball 1 is a land 32. The golf ball 1 is provided with a paint layer and a mark layer outside the cover 3, but these layers are not depicted.

The spherical core preferably has a single layered structure. This is because unlike a spherical core having a multiple layered structure, the spherical core having the single layered structure does not have energy loss at the interface of the multiple layered structure when being hit, and thus has higher resilience. In addition, the cover has a structure composed of at least one layer, and may has a single layered structure or a multiple layered structure composed of at least two layers. Examples of the golf ball according to the present invention include a two-piece golf ball composed of a spherical core and a single layered cover disposed around the spherical core; a multi-piece golf ball (including a three-piece golf ball) composed of a spherical core and at least two cover layers disposed around the spherical core; and a wound golf ball composed of a spherical core, a rubber thread layer which is formed around the spherical core, and a cover disposed around the rubber thread layer. The present invention can be suitably applied to any one of the above golf balls.

The golf ball of the present invention preferably has a diameter in a range from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball of the present invention preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the golf ball of the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.60 mm or more, more preferably 2.80 mm or more, and even more preferably 3.00 mm or more, and is preferably 5.40 mm or less, more preferably 5.20 mm or less, and even more preferably 5.00 mm or less. If the compression deformation amount is 2.6 mm or more, the golf ball does not become excessively hard, and thus the shot feeling thereof becomes better. On the other hand, if the compression deformation amount is 5.4 mm or less, the resilience of the golf ball becomes higher.

EXAMPLES

Next, the present invention will be described in detail by way of examples. However, the present invention is not limited to the examples described below. Various changes and modifications without departing from the spirit of the present invention are included in the scope of the present invention.

[Evaluation Methods]

(1) Compression Deformation Amount

A compression deformation amount of the core or golf ball (a shrinking amount of the core or golf ball along the compression direction), when applying a load from an initial load of 98 N to a final load of 1275 N to the core or golf ball, was measured.

(2) Core Hardness Distribution (Shore C Hardness)

The hardness measured at the surface of the core was adopted as the surface hardness of the core. In addition, the core was cut into two hemispheres to obtain a cut plane, and the hardness at the central point of the cut plane was measured. The hardness was measured with an automatic hardness tester (Digitest II, available from Bareiss company) using a testing device of "Shore C".

(3) Slab Hardness (Shore D Hardness)

Sheets with a thickness of about 2 mm were produced by injection molding the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".

(4) Durability

A W #1 driver provided with a metal head (XXIO S, loft angel: 11°, available from Dunlop Sports Limited) was installed on a swing robot M/C available from Golf Laboratories, Inc. The golf ball was hit repeatedly at a head speed of 45 m/sec until a crack occurred, and the hitting number when the crack occurred was counted. It is noted that the measurement was conducted using twelve samples for each golf ball, and the average value thereof was adopted as the hitting number for that golf ball. It is noted that the hitting number of the golf ball No. 1 was defined as 100, and the durability of each golf ball was represented by converting the hitting number of each golf ball into this index.

(5) Shot Feeling

An actual hitting test was carried out by ten amateur golfers (high skilled persons) using a driver. In accordance with the following grading standard, the feeling of each golfer at hitting the golf ball was evaluated. The shot feeling most evaluated by the ten golfers was adopted as the shot feeling of that golf ball.

Grading Standard

E (excellent): The ball is very soft and the shot feeling is very good.

G (good): The ball is soft and the shot feeling is good.

F (fair): The ball is a little hard but the shot feeling is acceptable.

P (poor): The ball is hard and the shot feeling is bad.

[Production of Golf Ball]

(1) Production of Core

According to the formulations shown in Table 1, the rubber compositions were kneaded with a kneading roll, and heat pressed in upper and lower molds, each having a hemispherical cavity, at 170° C. for 20 minutes to obtain spherical cores having a diameter of 39.7 mm. The amount of barium sulfate was adjusted such that the obtained golf balls had a mass of 45.3 g.

Zinc acrylate: "ZN-DA90S" available from Nisshoku Techno Fine Chemical Co., Ltd.

Zinc oxide: "Ginrei R" available from Toho Zinc Co., Ltd.

Barium sulfate: "Barium Sulfate BD" available from Sakai Chemical Industry Co., Ltd.

Diphenyl disulfide: available from Sumitomo Seika Chemicals Co., Ltd.

Dicumyl peroxide: "Percumyl (registered trademark) D" available from NOF Corporation SH3400P: Caprolactone modified polyrotaxane available from Advanced Softmaterials Inc.

SH2400B-0501: Polyrotaxane fine particles (crosslinked resin fine particles obtained by curing polyrotaxane with polyisocyanate, median particle size: 7.4 μm, decomposition starting temperature: 306° C.) available from Advanced Softmaterials Inc.

SH2400B-2001: Polyrotaxane fine particles (crosslinked resin fine particles obtained by curing polyrotaxane with polyisocyanate, median particle size: 20 μm, decomposition starting temperature: 306° C.) available from Advanced Softmaterials Inc.

(2) Production of Cover and Production of Golf Ball

According to the formulation shown in Table 2, cover materials were extruded with a twin-screw kneading extruder to prepare a cover composition in a pellet form. The extruding conditions of the cover composition were a screw diameter of 45 mm, a screw rotational speed of 200 rpm, and screw L/D=35, and the mixture was heated to 160 to 230° C. at the die position of the extruder. The obtained cover composition was injection molded onto the spherical core obtained above to produce a golf ball comprising a spherical core and a cover (thickness: 1.5 mm) covering the spherical core. Evaluation results of the obtained golf balls are shown in Table 1.

TABLE 1

| | | Golf ball No. | | | | | | |
|---|---|---|---|---|---|---|---|---|
| | | 1 | 2 | 3 | 4 | 5 | 6 | 7 |
| Core rubber composition (parts by mass) | Polybutadiene rubber | 100 | 100 | 100 | 100 | 100 | 100 | 100 |
| | Zinc acrylate | 27.5 | 27.5 | 27.5 | 27.5 | 27.5 | 27.5 | 27.5 |
| | Zinc oxide | 5 | 5 | 5 | 5 | 5 | 5 | 5 |
| | Barium sulfate | * | * | * | * | * | * | * |
| | Diphenyl disulfide | 0.5 | 0.5 | 0.5 | 0.5 | 0.5 | 0.5 | 0.5 |
| | Dicumyl peroxide | 0.8 | 0.8 | 0.8 | 0.8 | 0.8 | 0.8 | 0.8 |
| | SH2400B-0501 (particle size: 7.4 μm) | — | 3 | 10 | 15 | — | 20 | — |
| | SH2400B-2001 (particle size: 20 μm) | — | — | — | — | 3 | — | — |
| | SH3400P | — | — | — | — | — | — | 10 |
| Core properties | Diameter (mm) | 39.7 | 39.7 | 39.7 | 39.7 | 39.7 | 39.7 | 39.7 |
| | Surface hardness (Shore C) | 82 | 82 | 81 | 80 | 82 | 79 | 80 |
| | Center hardness (Shore C) | 65 | 65 | 64 | 64 | 65 | 63 | 63 |
| | Compression deformation amount (mm) | 3.05 | 3.08 | 3.15 | 3.2 | 3.09 | 3.3 | 3.23 |
| Golf ball | Durability | 100 | 108 | 118 | 125 | 108 | 107 | 106 |
| | Shot feeling | Standard (F) | G | G | E | G | G | G |

* Appropriate amount

The materials used in Table 1 are shown below.

Polybutadiene rubber: BR730 (amount of cis-1,4 bond=95 mass %, amount of 1,2-vinyl bond=1.3 mass %, Moony viscosity ($ML_{1+4}$ (100° C.)=55, molecular weight distribution (Mw/Mn)=3) available from JSR Corporation

TABLE 2

| Cover composition No. | 1 |
|---|---|
| Himilan 1555 | 47 |
| Himilan 1557 | 46 |

TABLE 2-continued

| Cover composition No. | 1 |
|---|---|
| TEFABLOC T3221C | 7 |
| Titanium dioxide (A220) | 4 |
| JF-90 | 0.2 |
| Hardness (Shore D) | 57 |

Formulation: Parts by Mass

The materials used in Table 2 are shown below.

Himilan 1555: Na-neutralized ethylene-methacrylic acid copolymer ionomer resin available from Du Pont-Mitsui Polychemicals Co., Ltd.

Himilan 1557: Zn-neutralized ethylene-methacrylic acid copolymer ionomer resin available from Du Pont-Mitsui Polychemicals Co., Ltd.

TEFABLOC T3221C: thermoplastic elastomer containing styrene block available from Mitsubishi Chemical Corporation A220: titanium dioxide available from Ishihara Sangyo Kaisha, Ltd.

JF-90: light stabilizer available from Johoku chemical Co., Ltd.

As shown in Table 1, the golf ball comprising a constituent member containing a crosslinked rubber component and resin fine particles, wherein the resin fine particles contain a polyrotaxane component having a cyclodextrin, a linear molecule piercing through the cyclic structure of the cyclodextrin, and blocking groups located at both terminals of the linear molecule to prevent disassociation of the cyclodextrin, wherein at least a part of hydroxyl groups of the cyclodextrin is modified with a caprolactone chain via a —O—$C_3H_6$—O— group, has excellent shot feeling and durability.

The golf ball according to the present invention has excellent shot feeling and durability.

This application is based on Japanese patent application No. 2018-195345 filed on Oct. 16, 2018, the content of which is hereby incorporated by reference.

The invention claimed is:

1. A golf ball comprising a constituent member containing a crosslinked rubber component and resin fine particles, wherein the resin fine particles contain a polyrotaxane component having a cyclodextrin, a linear molecule piercing through the cyclic structure of the cyclodextrin, and blocking groups located at both terminals of the linear molecule to prevent disassociation of the cyclodextrin, wherein at least a part of hydroxyl groups of the cyclodextrin is modified with a caprolactone chain via a —O—$C_3H_6$—O— group.

2. The golf ball according to claim 1, wherein the resin fine particles have a median size of from 1 μm to 50 μm.

3. The golf ball according to claim 1, wherein the resin fine particle are crosslinked resin fine particles.

4. The golf ball according to claim 3, wherein the crosslinked resin fine particles are a product obtained by a reaction between the polyrotaxane component and a polyisocyanate component.

5. The golf ball according to claim 1, wherein the linear molecule of the polyrotaxane is polyethylene glycol, and the blocking group of the polyrotaxane is an adamantyl group.

6. The golf ball according to claim 1, wherein the constituent member is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) the resin fine particles.

7. The golf ball according to claim 6, wherein the rubber composition contains (d) the resin fine particles in an amount of from 1 part by mass to 15 parts by mass with respect to 100 parts by mass of (a) the base rubber.

8. The golf ball according to claim 1, wherein the golf ball comprises a spherical core and one or more cover, and the spherical core is the constituent member.

9. The golf ball according to claim 8, wherein the spherical core is a single layered spherical core.

10. The golf ball according to claim 8, wherein the spherical core has a center hardness (H0) in a range of from 45 to 70 in Shore C hardness.

11. The golf ball according to claim 8, wherein the spherical core has a surface hardness (Hs) in a range of from 70 to 90 in Shore C hardness.

12. The golf ball according to claim 8, wherein the cover is formed from a cover composition containing an ionomer resin.

13. The golf ball according to claim 12, wherein the cover composition further contains a thermoplastic styrene elastomer.

14. The golf ball according to claim 12, wherein a resin component of the cover composition contains the ionomer resin in an amount of 50 mass % or more.

15. The golf ball according to claim 6, wherein the rubber composition further contains (f) a metal compound and/or (g) an organic sulfur compound.

* * * * *